United States Patent
Kashiwagi et al.

(10) Patent No.: US 6,376,738 B1
(45) Date of Patent: Apr. 23, 2002

(54) PROCESS AND SYSTEM FOR TREATING MATERIAL CONTAINING NOXIOUS COMPONENTS

(75) Inventors: Yoshiyuki Kashiwagi, Tochigi; Haruhisa Ishigaki, Shizuoka; Nobuyuki Yoshioka, Tokyo, all of (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 09/253,051

(22) Filed: Feb. 19, 1999

(30) Foreign Application Priority Data

Feb. 20, 1998 (JP) .......................... 10-038368
Mar. 3, 1998 (JP) .......................... 10-050219

(51) Int. Cl.$^7$ .............................. H62D 3/00; C01F 5/26; C22B 26/10
(52) U.S. Cl. ........................ 588/213; 588/209; 588/206; 588/220; 423/497; 423/499; 423/499.4
(58) Field of Search ................................ 588/209, 213, 588/220, 206; 423/497, 499.1, 499.4

(56) References Cited

U.S. PATENT DOCUMENTS

| | | | |
|---|---|---|---|
| 3,977,844 A | 8/1976 | Van Slyke | 48/202 |
| 4,661,291 A | 4/1987 | Yamasaki et al. | 252/629 |
| 5,273,566 A | 12/1993 | Balcar et al. | 65/17 |
| 5,547,653 A | * 8/1996 | Webster et al. | 423/445 R |
| 5,688,117 A | 11/1997 | May et al. | 432/103 |
| 5,776,420 A | * 7/1998 | Nagel | 422/184 |
| 5,821,395 A | * 10/1998 | Price et al. | 585/241 |
| 6,077,328 A | * 6/2000 | Brockhoff et al. | 75/414 |

FOREIGN PATENT DOCUMENTS

| | | |
|---|---|---|
| DE | 32 17 040 | 11/1983 |
| JP | 54-93864 | 7/1979 |
| JP | 59-12733 | 1/1984 |
| JP | 1-296007 | 11/1989 |
| JP | 2-10341 | 3/1990 |
| JP | 5-33916 | 2/1993 |
| JP | 8-510789 | 11/1996 |
| JP | 9-155326 | 6/1997 |

OTHER PUBLICATIONS

Database WPIL on Questel, week 1982–01 3p, London: Derwent Publications Ltd., AN 1982–00479E, JP 56–152776 A (Ebara Infilco KK), abstract.
Database WPIL on Questel, week 1985–12 5p, London: Derwent Publications Ltd., AN 1985–070958, JP 60–024332 A (Nippon Mining Co), abstract.
Patent Abstracts of Japan, vol. 1995, No. 09, Oct. 31, 1995 & JP 07 150150 A (Topy Ind. Ltd), Jun. 13, 1995.
Japanese Industrial Standard; "Gas Detector Tubes (Length–of–Stain Type)"; JIS K 0804; 1992; pp. 1–20.

* cited by examiner

Primary Examiner—Steven P. Griffin
Assistant Examiner—Jonas N. Strickland
(74) Attorney, Agent, or Firm—Foley & Lardner

(57) ABSTRACT

A process for treating a waste or treatable material containing noxious component(s), comprising the following steps: (1) carrying out a first step for the treatable material, the first step including (a) mixing a treatment agent with the treatable material to form a mixture, the treatment agent containing alkali metal compound, and (b) heating the mixture in a first furnace at a first temperature in a low oxygen atmosphere to thermally decompose the treatable material to generate a substance containing the noxious component, the substance contacting and reacting with the treatment agent to form a harmless salt; and (2) carrying out a second step for the treatable material, the second step including heating the treatable material in a second furnace separate from the first furnace, at a second temperature higher than the first temperature so as to reduce volume of the treatable material.

16 Claims, 4 Drawing Sheets

PROCESS AND SYSTEM FOR TREATING MATERIAL CONTAINING NOXIOUS COMPONENTS

BACKGROUND OF THE INVENTION

1. Field of the Invention

This invention relates to improvements in a process and a system for treating a treatable material such as waste containing a large amount of noxious components such as halogen substances and sulfur, under a heat treatment, in order to prevent generation of virulently poisonous dioxins and make waste gas and the treatable material harmless.

2. Description of the Prior Art

General waste such as urban waste (trash), industrial waste, shredder dust, and plastic waste such as polyvinyl chloride contain a large amount of halogen substances (chlorine, bromine, iodine, fluorine, and astatine), particularly chlorine. Accordingly, when such waste or the like is subjected to heat treatment such as incineration, a large amount of noxious chlorine-containing gas such as hydrogen chloride gas and chlorine gas is generated and becomes a cause for producing virulently poisonous dioxins in residue obtained after the incineration and in flying ash contained in waste gas. Such incineration treatment has been made also on waste (such as waste tire) containing sulfur, in which a large amount of sulfur oxides gas (SOx) are generated. Therefore, treatment for such sulfur oxides gas has been accomplished.

In order to remove the above noxious gases, it has been proposed to spray alkali material (such as lime powder) into an incineration furnace supplied with waste (the treatable material), as disclosed in Japanese Patent Provisional Publication No. 54-93864. In this proposition, the sprayed alkali material reacts with chlorine-containing gas generated under incineration of the waste, thereby to form harmless chloride (such as calcium chloride) thus making waste gas harmless.

It has been also proposed that waste is incinerated upon adding calcium-containing alkali material such as lime ($CaCO_3$) or slaked lime ($Ca(OH)_2$), or that the alkali material is filled in a filter through which waste gas is passed, thus removing noxious chloride gas or sulfur oxides gas from the waste gas. Such propositions are disclosed in Japanese Patent Publication No. 2-10341, Japanese Patent Provisional Publication No. 1-296007, and Japanese Patent Provisional Publication No. 59-12733.

It will be understood that the above conventional techniques are intended to once allow noxious gas to be generated, and thereafter to remove the noxious gas.

Furthermore, it has been known that the treatable material is thermally decomposed or subjected to dry distillation, and thereafter residue formed upon thermal decomposition is reduced in volume under carbonization, ashing or the like. One of such treatments is carried out as follows: The treatable material is thermally decomposed in a single rotatable furnace (rotary kiln). Residue discharged from the rotatable furnace is thereafter incinerated in a stoker. Thermal decomposition gas from the rotatable furnace is burned in a re-burning chamber, generating high temperature gas. The high temperature gas (waste gas) is passed through a boiler or the like and then introduced into a reaction tower into which slaked lime slurry is sprayed so as to react with the waste gas. This process is disclosed in Japanese Patent Provisional Publication No. 5-33916.

Another is carried out as follows: Waste (the treatable material) is heat-treated in a rotary treatment furnace under low temperature dry distillation so as to convert the treatable material into low temperature dry distillation gas and thermally decomposed residue. The residue is burnt in a high temperature burning furnace thereby forming slag in a molten state. Then, this slag is cooled to be solidified in a glass state. The dry distillation gas emitted from the rotary treatment furnace is supplied to a boiler, or discharged upon treatment by a filter or a gas purifying device. Such a process is disclosed in Japanese Patent Publication (Tokuhyohei) No. 8-510789.

According to the above treatment processes under incineration, the alkali material is sprayed into the incineration furnace, and therefore treatment of noxious gas is made near a location where the noxious gas is generated; however, the treatment is made after the noxious gas has been once generated. As a result, although the removal effect for chlorine-containing gas can be expected to some extent, a sufficient removal effect cannot be so obtained as to meet a recent strict regulation for preventing air pollution. Additionally, such treatment processes are accomplished under incineration and therefore high in reaction temperature. As a result, it is difficult to maintain a stable reaction. In case that a large amount of the alkali material is sprayed, the alkali material affects burning itself so that unburned parts are formed. Thus, it is impossible to meet the recent strict regulation for preventing air pollution.

According to the above other treatment processes under the dry distillation, the treatable material is thermally decomposed without being burnt, so that unstable factors such as incineration furnace and the like can be readily removable. However, the treatment process in which alkali material is sprayed into the furnace will provide the same effects as those in the treatment process under incineration.

In case that waste gas contains a large amount of noxious gases (particularly chlorine-containing gas and sulfur oxides gas), corrosion of the furnace and gas duct is remarkable so that there is the fear of lowering durability of the waste treating facility and raising gas leak, thus making maintenance of the facility difficult.

Further, in case that the waste contains sulfur component, when the waste is incinerated upon adding calcium-containing alkali material such as CaO to react with sulfur oxides gas, $CaSO_4$ (calcium sulfate) called gypsum is formed. Gypsum solidifies upon absorbing water content, and therefore post-treatment for gypsum becomes difficult.

As appreciated from the above, according to any of the above-discussed treatment processes, noxious gas is once generated from the treatable material at a former step, and thereafter chlorine-containing gas, sulfur oxides gas and dioxins are removed at a latter step by means of a bag filter or burning treatment. Accordingly, it is difficult to sufficiently remove noxious gases and dioxins.

In order to solve the above-discussed problems, the following treatment process has also been proposed: When the treatable material is heat-treated in a treating furnace, a suitable amount of alkali material (treatment agent) liable to react with chlorine component is mixed with the treatable material so as to fix the chlorine component in residual ash thereby obtaining harmless waste gas. The residual ash is rinsed with water or the like thereby removing the chlorine component. This process is disclosed in Japanese Patent Provisional Publication No. 9-155326.

In this process, the treatment for thermally decomposing the treatable material to generate decomposition gas is accomplished in a single treating furnace. In other words, a series of steps for supplying the treatable material into the single treating furnace through the supply inlet and for discharging carbonized material from the single treating furnace through the discharge outlet are accomplished in the single treating furnace. In the series of steps, the treatable material is stirred and subjected to heat treatment (for example, for 1 hour and at a temperature ranging from 300 to 600° C.), thereby successively accomplishing the respective steps of drying, thermally decomposing and volume-reducing (carbonizing) the treatable material.

Now, noxious gas containing halogen substances are generated at a temperature ranging from 200 to 350° C. upon thermal decomposition of the treatable material, in which the treatable material and the treatment agent react with each other to form harmless salts. However, there is the possibility that a part of the noxious gas is left in its non-reacted state. Additionally, the treatable material is being stirred, and therefore there is the possibility that the non-reacted noxious gas can be involved in the treatable material. In case that the treatable material is heated at a temperature over 350° C. so as to form carbonized material, the noxious gas will be absorbed in the carbonized material.

When the carbonized material, the noxious gas and produced dioxins produced exist simultaneously, the carbonized material unavoidably adsorbs these noxious gas and dioxins. It will be appreciated that it is very difficult to remove the noxious and dioxins which have been once adsorbed. Accordingly, it is difficult to reuse the carbonized material, and therefore it is required to bury the carbonized material in a final disposal place, or otherwise to cause the carbonized material to be subjected to another treatment such as a fusion treatment at a very high temperature.

SUMMARY OF THE INVENTION

In view of the above, the present invention is intended to cause the noxious substances generated from the treatable material to contact and react with the treatment agent (alkali material) thereby to form harmless salt(s) when the treatable material is thermally decomposed in a heat treating furnace, thus making waste gas and residue harmless. The residue which has been thus made harmless is reduced in volume, for example, under carbonization in another heat treating furnace, thereby making it possible to reuse the residue.

As result of the inventors' studies on the experiments, the following facts have been revealed: Noxious gas (particularly, chloride gas and sulfur oxides gas) can be effectively prevented from being rolled in the treatable material (residue) by carrying out a decomposition and reaction step (for thermally decomposing the treatable material to generate noxious gas and for causing the noxious gas to react with the treatment agent) and a volume-reduction step (for reducing the volume of the treatable material) respectively in separate heat treating furnaces, as former and latter steps, so that noxious components cannot be left in the treatable material (residue).

Additionally, according to the inventors' experiments, the following facts have been recognized: In case that a calcium compound such as calcium carbonate is added as the treatment agent, the noxious component removing effect can be expected to some extent as compared with the effect in case that no treatment agent is added. However, in case that alkali metal (such as sodium or potassium) compound is added as the treatment agent, a plurality of the noxious components can be effectively removed.

In other words, it has been known that when halogen substances (particularly, chlorine-containing gas) and alkali material contact with each other, reaction is made therebetween to form harmless halogen salts such as chloride; however, the halogen removing effect is not sufficient. In this regard, a sufficient noxious component removing effect can be expected by adding alkali metal compound as the treatment agent when the treatable material containing chlorine and/or sulfur is thermally treated, in which the noxious component(s) is removed from decomposition gas generated from the treatable material thereby forming harmless salt(s) such as chloride and/or sulfite) while emitting harmless waste gas. This waste gas can be used as fuel. It is a matter of coarse that the waste gas can be discharged to the atmosphere after such a treatment as to remove dust. Additionally, residue formed upon the heat treatment of the treatable material is made harmless, in which the salt(s) left in the residue can be dissolved out by being rinsed with a solution such as water. Furthermore, it has been found that, in case that the treatable material contains metal components, metals and the carbonized material forming part of the residue can be recovered to be reused.

The present invention has been envisaged and accomplished on the basis of the above-discussed knowledge.

Therefore, an object of the present invention is to provide improved process and system for treating a treatable material containing noxious component(s), which can effectively overcome drawbacks encountered in similar convention processes.

Another object of the present invention is to provide an improved process and system for treating a treatable material containing noxious component(s), in which residue and waste gas were made harmless, thereby making it possible to reuse the residue.

A further object of the present invention is to provide an improved process and system for treating a treatable material containing noxious component(s), in which noxious substance (gas) generated from the treatable material under thermal decomposition can be effectively prevented from being rolled in and kept in the treatable material, thus making the residue harmless.

A still further object of the present invention is to provide an improved process and system for treating a treatable material containing noxious component(s), in which a step for thermally decomposing the treatable material to generate noxious substance (gas) and for causing the noxious substance to react with a treatment agent (alkali material), and another step for reducing the volume of the treatable material are carried out respectively in separate heat treating furnaces so as to prevent the noxious substance from being rolled in and kept in the treatable material.

An aspect of the present invention resides in a process for treating a treatable material containing a noxious component, comprising the following steps: (1) carrying out a first (decomposition and reaction) step for the treatable material, the first step including (a) mixing a treatment agent with the treatable material to form a mixture, the treatment agent containing alkali material, and (b) heating the mixture in a first furnace to thermally decompose the treatable material to generate a substance containing the noxious component, the substance contacting and reacting with the treatment agent to form a harmless salt; and (2) carrying out a second (volume-reduction) step for the treatable material, the second step including heating the treatable material in a second furnace separate from the first furnace so as to reduce volume of the treatable material.

Another aspect of the present invention resides in a process for treating a treatable material containing a noxious component, comprising the following steps: (1) carrying out a first step for the treatable material, the first step including (a) mixing a treatment agent with the treatable material to form a mixture, the treatment agent containing alkali metal compound, and (b) heating the mixture in a first furnace at a first temperature in a low oxygen atmosphere to thermally decompose the treatable material to generate a substance containing the noxious component, the substance contacting and reacting with the treatment agent to form a harmless salt; and (2) carrying out a second step for the treatable material, the second step including heating the treatable material in a second furnace separate from the first furnace, at a second temperature higher than the first temperature so as to reduce volume of the treatable material.

A further aspect of the present invention resides in a system for treating a treatable material containing a noxious component. The system comprises at least one first heat treating furnace which includes a first cylinder body having first and second end sections. The first and second end sections are formed respectively with a supply inlet and a discharge outlet. The first heat treating furnace further includes a first mixing and conveying device for mixing and conveying the treatable material supplied through the supply inlet toward the discharge outlet, and a first heating device located outside the cylinder body to heat the cylinder body. The first cylinder body has an axis which extends generally horizontally. At least one second heat treating furnace is provided to be located separate from the first heat treating furnace and includes a second cylinder body having first and second end sections. The first and second end sections are formed respectively with a supply inlet and a discharge outlet. The second heat treating furnace includes a second mixing and conveying device for mixing and conveying the treatable material supplied through the supply inlet toward the discharge outlet, and a second heating device located outside the cylinder body to heat the cylinder body. The second cylinder body having an axis which extends generally horizontally. Additionally, a duct is provided for connecting the discharge outlet of the first cylinder body and the supply inlet of the second cylinder body. In this treating system, a first treatment is accomplished in the first cylinder body of the first heat treating furnace in such a manner as to mix a treatment agent containing alkali material with the treatable material to form a mixture, and to heat the mixture so as to thermally decompose the treatable material to generate a substance containing the noxious component, the substance contacting and reacting with the treatment agent to form a harmless salt. The treatable material in the first cylinder body of the first heat treating furnace is transferred through the duct to the second cylinder body of the second heat treating furnace. Additionally, a second treatment is accomplished in the second cylinder body of the second heat treating furnace in such a manner as to heat the transferred treatable material to reduce volume of the treatable material.

BRIEF DESCRIPTION OF THE DRAWINGS

In the drawings, like reference numerals designate like parts and elements throughout all figures, in which.

DETAILED DESCRIPTION OF THE INVENTION

Figure 1:
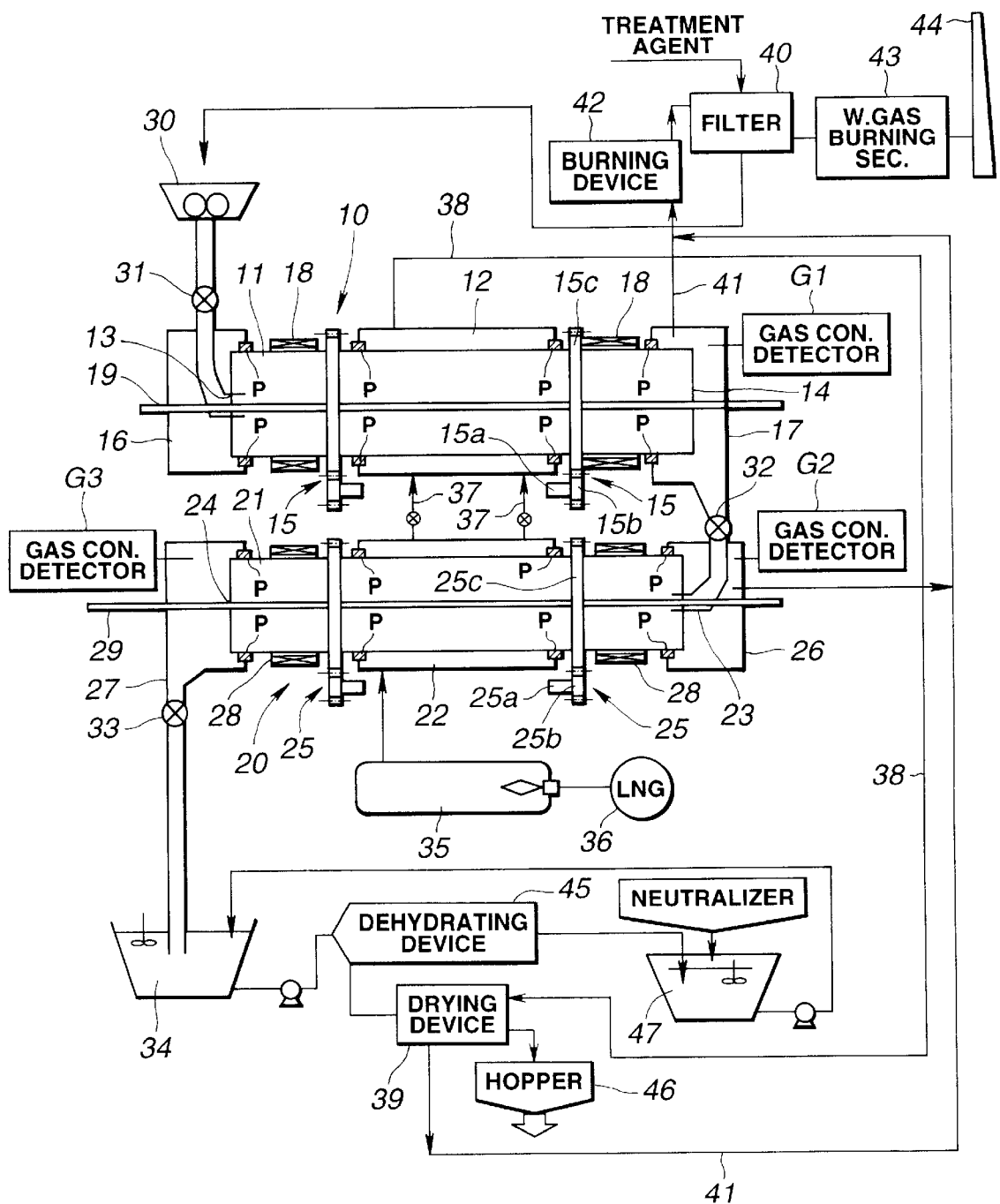
FIG. 1 is a schematic illustration of an embodiment of a waste (treatable material) treating system or facility according to the present invention.

According to the present invention, a process for treating a treatable material (such as urban waster or trash, or industrial waste) containing a noxious component, comprises the following steps: (1) carrying out a first (decomposition and reaction) step for the treatable material, the first step including (a) mixing a treatment agent with the treatable material to form a mixture, the treatment agent containing alkali material, and (b) heating the mixture in a first furnace to thermally decompose the treatable material to generate a substance containing the noxious component, the substance contacting and reacting with the treatment agent to form a harmless salt; and (2) carrying out a second (volume-reduction) step for the treatable material, the second step including heating the treatable material in a second furnace separate from the first furnace so as to reduce volume of the treatable material.

In the decomposition and reaction step, the treatable material and the alkali material (for example, alkali metal compound) are supplied into the (first) heat treating furnace and heated at a temperature ranging from 200° C. to 350° C. The treatable material and the alkali material are mixed with each other to form a mixture before and after being supplied into the heat treating furnace. When the mixture is heated in the heat treating furnace, the treatable material is thermally decomposed thereby generating noxious substance or gas containing noxious component(s) such as chlorine and/or sulfur. The noxious gas contains noxious gas(es) such as hydrogen chloride (HCl) and/or sulfur oxides (SOx). The gas is immediately brought into contact with the alkali material existing in the treatable material and immediately reacts with the alkali material thereby to form harmless salt(s). Thus, emitted or waste gas can be made harmless while the treatable material can become residue containing no noxious component(s). In this decomposition and reaction step, the mixture of the treatable material and the alkali material is heated in a low oxygen concentration atmosphere which means an atmosphere in which the concentration of oxygen is low, which can be accomplished by closing a supply inlet and a discharge outlet of the heat treating furnace or tank upon casting the mixture into the furnace. It will be understood that the low oxygen concentration atmosphere corresponds to a condition in which atmospheric air remains within the furnace whose inlet and outlet have been closed. In other words, the low oxygen concentration atmosphere corresponds to a condition in which the mixture is put in the furnace which is substantially sealed so as to prevent fresh air from being supplied into the furnace, in which a pressure in the furnace leaks out of the furnace. Accordingly, the low oxygen concentration atmosphere does not require a complete closing or sealing state of the furnace and includes also a condition in which the side of the inlet of the furnace is closed with the treatable material itself, in which a gas pressure within the furnace is raised under heating so that supply of air from the outside of the furnace is hardly made. The low oxygen concentration atmosphere may be a thermal decomposition atmosphere in which the treatable material thermally decomposes to generate so-called thermal decomposition gas of the treatable material. Thus, the low oxygen concentration atmosphere accomplishes dry distillation of the treatable material.

Examples of the alkali material to be used as the treatment agent in the above decomposition and reaction step are:

(1) alkali metal hydrogen carbonate, alkali metal carbonate and the like, such as sodium hydrogen carbonate ($NaHCO_3$), sodium carbonate ($Na_2CO_3$), sodium sesqui carbonate ($Na_2CO_3 \cdot NaHCO_3 \cdot 2H_2O$), and natural soda (containing $Na_2CO_3 \cdot NaHCO_3 \cdot 2H_2O$);

(2) alkali metal hydroxide such as sodium hydroxide (NaOH), potassium hydroxide (KOH); and (3) alkali metal carbonate and alkali metal hydrogen carbonate such as potassium carbonate ($K_2CO_3$), potassium hydrogen carbonate ($KHCO_3$), and potassium sodium carbonate ($KNaCO_3 \cdot 6H_2O$).

(4) alkaline-earth oxide such as calcium oxide (CaO), magnesium oxide (MgO), barium oxide (BaO);

(5) alkaline-earth carbonate such as calcium carbonate $CaCO_3$, magnesium carbonate $MgCO_3$, barium carbonate ($BaCO_3$), strontium carbonate ($SrCO_3$), and dolomite ($CaMg(CO_3)_2$);

(6) alkaline-earth hydroxide such as calcium hydroxide ($Ca(OH)_2$), magnesium hydroxide $Mg(OH)_2$, barium hydroxide ($Ba(OH)_2$) hydrate, strontium hydroxide ($Sr(OH)_2$).

It will be understood that the above-listed compounds are used singly or in combination as the treatment (noxious component removal) agent. In other words, the treatment agent contains at least one of sodium hydrogen carbonate, sodium carbonate, sodium sesqui carbonate, natural soda, sodium hydroxide, potassium hydroxide, potassium carbonate, potassium hydrogen carbonate, and potassium sodium carbonate, calcium oxide, magnesium oxide, barium oxide, calcium carbonate, magnesium carbonate, barium carbonate, strontium carbonate, and dolomite, calcium hydroxide, magnesium hydroxide, barium hydroxide hydrate, strontium hydroxide.

Preferable examples of the alkali material are alkali metal (sodium or potassium) hydrogen carbonate, alkali metal (sodium or potassium) carbonate, and alkali metal (sodium or potassium) hydroxide. More specifically, the preferable examples of the alkali substance are sodium hydrogen carbonate ($NaHCO_3$), sodium carbonate ($Na_2CO_3$), sodium sesqui carbonate ($Na_2CO_3 \cdot NaHCO_3 \cdot 2H_2O$), natural soda (containing $Na_2CO_3 \cdot NaHCO_3 \cdot 2H_2O$), potassium carbonate ($K_2CO_3$), potassium hydrogen carbonate ($KHCO_3$), potassium sodium carbonate ($KNaCO_3 \cdot 6H_2O$), sodium hydroxide (NaOH), and potassium hydroxide (KOH). The above sodium carbonate is commonly called soda carbonate, soda, soda ash, washing soda or crystal soda. The above sesqui carbonate is commonly called trisodium monohydrogen dicarbonate. The above natural soda is commonly called trona. It will be understood that the above listed preferable compounds are used singly or in combination as the treatment agent. In other words, the treatment agent preferably contains at least one of sodium hydrogen carbonate, sodium carbonate, sodium sesqui carbonate, natural soda, potassium carbonate, potassium hydrogen carbonate, potassium sodium carbonate, sodium hydroxide, and potassium hydroxide.

In the decomposition and reaction step, the noxious gas such as hydrogen chloride (HCl) and sulfur oxides (SOx) are converted into harmless salts thereby making emitted or waste gas harmless while leaving the treatable material as residue containing no noxious components, under reactions represented by the following chemical equations:

(1) Regarding hydrogen chloride (HCl):

In case that sodium hydrogen carbonate is used as the treatment agent, $$NaHCO_3 + HCl \rightarrow NaCl + H_2O + CO_2$$

In case that potassium hydrogen carbonate is used as the treatment agent, $$KHCO_3 + HCl \rightarrow KCl + H_2O + CO_2$$

In case of sodium hydroxide, $$NaOH + HCl \rightarrow NaCl + H_2O$$

In case that potassium hydroxide is used as the treatment agent, $$KOH + HCl \rightarrow KCl + H_2O$$

(2) Regarding sulfur oxides (SOx):

In case that sodium hydrogen carbonate is used as the treatment agent, $$NaHCO_3 \rightarrow NaOH + CO_2$$

$$2NaOH + SO_2 \rightarrow Na_2SO_3 + H_2O$$

In case that potassium hydrogen carbonate is used as the treatment agent, $$KHCO_3 \rightarrow KOH + CO_2$$

$$2KOH + SO_2 \rightarrow K_2SO_3 + H_2O$$

In case that sodium hydroxide is used as the treatment agent, $$2NaOH + SO_2 \rightarrow Na_2SO_3 + 2H_2O$$

In case that potassium hydroxide is used as the treatment agent, $$2KOH + SO_2 \rightarrow K_2SO_3 + H_2O$$

In case that sodium potassium carbonate is used as the noxious component removal agent, $$Na_2CO_3 + K_2CO_3 + 2SO_2 \rightarrow Na_2SO_3 + K_2SO_3 + 2CO_2$$

According to the above-mentioned reactions, noxious HCl is converted into harmless NaCl or KCl; and noxious SOx is converted into harmless sulfite ($Na_2SO_3$, $K_2SO_3$), thus achieving conversion of noxious gas into harmless salts.

In the decomposition and reaction step, a step of forming the salts may be carried out after a drying step at which the treatable material is dried. The salts forming step and the drying step may be carried out in the same heat treating furnace or separate heat treating furnaces.

After the decomposition and reaction step has been completed in the (first) heat treating furnace, the treatable material (residue and the salts) is moved through a duct into another (second) heat treating furnace to accomplish the volume-reduction step of the treatable material. In the volume reduction step, the thus moved treatable material is heated in the (second) heat treating furnace to be subjected to, for example, carbonization or ashing so as to be reduced in volume. It will be understood that, in the volume reduction step, the treatable material may be heated to obtain its state where combustible parts (such as hydrocarbons or the like) have been gasified and discharged from the treatable material. This state of the treatable material may be obtained at a step before the treatable material reaches its carbonization, during heating in the volume-reduction step.

The above treating process for the treatable material is accomplished by using a waste treating facility or treating system which is arranged as follows: At least one first heat treating furnace is provided including a first cylinder body having first and second end sections. The first and second end sections are formed respectively with a supply inlet and a discharge outlet. The first heat treating furnace further includes a first mixing and conveying device for mixing and conveying the treatable material supplied through the supply inlet toward the discharge outlet, and a first heating device located outside the cylinder body to heat the cylinder body. The first cylinder body has an axis which extends generally horizontally. At least one second heat treating furnace is provided to be located separate from the first heat treating furnace and includes a second cylinder body having first and second end sections. The first and second end sections are formed respectively with a supply inlet and a discharge outlet. The second heat treating furnace includes a second mixing and conveying device for mixing and conveying the treatable material supplied through the supply inlet toward the discharge outlet, and a second heating device located outside the cylinder body to heat the cylinder body. The second cylinder body having an axis which extends generally horizontally. Additionally, a duct is provided for connecting the discharge outlet of the first cylinder body and the supply inlet of the second cylinder body. In this treating system, a first treatment is accomplished in the first cylinder body of the first heat treating furnace in such a manner as to mix a treatment agent containing alkali material with the treatable material to form a mixture, and to heat the mixture so as to thermally decompose the treatable material to generate a substance containing the noxious component, the substance contacting and reacting with the treatment agent to form a harmless salt. The treatable material in the first cylinder body of the first heat treating furnace is transferred through the duct to the second cylinder body of the second heat treating furnace. Additionally, a second treatment is accomplished in the second cylinder body of the second heat treating furnace in such a manner as to heat the transferred treatable material to reduce volume of the treatable material.

Preferably, the cylinder bodies of the first and second heating furnaces are located parallel and respectively up and down in such a manner that their axes extend generally horizontally, in which the cylinder body of the first heating furnace is positioned (to accomplish the decomposition and reaction step) above the cylinder body of the second heating furnace in which the volume-reduction step is accomplished. By virtue of this up-and-down configuration, the treatable material can be smoothly transferred from the decomposition and reaction step to the volume-reduction step.

In case that the cylinder bodies of the first and second heating furnaces are located parallel and respectively side by side in such a manner that their axes extend generally horizontally, a conveying device such as screw conveyor or another conveyor is provided between the discharge outlet of the cylinder body of the first heating furnace and the supply inlet of the cylinder body of the second heating furnace.

It will be understood that one or both of the first and second heat treating furnaces may include a plurality of similar heating furnaces. For example, the first heat treating furnace may include two similar heat treating furnaces which are connected to each other, in which drying the treatable material is accomplished in one heat treating furnace while the decomposition and reaction step is carried out in another heat treating furnace. Further, the second heat treating furnace includes two similar heat treating furnaces which are connected to each other, in which carbonization of the treatable material is accomplished in one heat treating furnace while ashing the treatable material is accomplished in another heat treating furnace. In this case, the carbonization and ashing are carried out continuously so that the ashing is carried out after the carbonization, or discontinuously so that the carbonization and the ashing are carried out simultaneously.

It will be appreciated that, in case that the cylinder bodies of the first (one) and second (one) heating furnaces are arranged horizontal, the cylinder bodies of the first (upper) and second (lower) heating furnaces may be located on one side of the duct such that the axes of the cylinder bodies of the first and second heating furnaces are parallel with each other; the cylinder bodies of the first and second heating furnaces may be located on opposite sides of the duct; and otherwise the cylinder bodies of the first and second heating furnaces are located around the duct such that the axis of one cylinder body is angular arranged to the axis of the other cylinder body.

The above-mentioned heating device includes a heating coil of an induction heating apparatus or of a resistance heating apparatus, and/or a heating cylinder (or gas duct). Each of the heating coil and the heating cylinder is disposed around the outer periphery of the cylinder body of the first and second heating furnaces. The heating coil generates heat upon being supplied with electric current, thereby heating the cylinder body. The heating cylinder is supplied with heated gas, thereby heating the cylinder body.

Each cylinder body is arranged to be rotatable around its axis, in which each cylinder body is provided at its outer peripheral surface with an annular driven gear which is engaged with a drive gear driven by an electric motor. In case that the first and second heat treating furnaces are respectively located up and down, the cylinder bodies of the first and second heating furnaces are respectively provided at their outer peripheral surfaces with the annular driven gears which are driven through the drive gears by a common electric motor. It will be understood that each cylinder body may not be rotatable so as to be fixed, in which a conveying mechanism such as a screw conveyer is disposed inside the cylinder body to axially move the treatable material in the cylinder body.

As appreciated from the above, according to the present invention, the decomposition and reaction step and the volume-reduction step are carried out respectively in the first and second heat treating furnaces which are separate from each other.

Such an idea of the present invention is accomplished by the waste treating facility or treating system whose one embodiment is schematically illustrated in FIG. 1.

Referring now to FIG. 1, the waste treating facility or tearing system comprises a first heat treating furnace 10, and a second heat treating furnace 20. The first heat treating furnace 10 includes a rotatable cylinder body 11. A heating cylinder 12 is sealingly disposed surrounding the cylindrical body 11 under the action of a dynamic seal P, and located coaxial with the cylinder body 11 so as to form a gas duct to which high temperature gas is introduced in order to heat the cylinder body 11. The cylindrical member 11 is formed at its one end with a supply inlet 13 through which the treatable material is supplied into the cylinder body 11, and at the other end with a discharge outlet 14. The cylinder body 11 is driven to rotate around its axis under the action of a rotationally driving device 15 which includes a driving motor 15a to which a driving gear 15b is drivably connected. A driven gear 15c is provided on the peripheral surface of the cylindrical body 11 to be coaxial with the cylindrical body 11. The driven gear 15c is engaged with the driving gear 15b.

A supply duct 16 is provided to the one end of the cylinder body 11 in a manner to sealingly surround the one end (having the supply inlet 13) of the cylindrical body 11 under the action of the dynamic seal P. A discharge duct 17 is provided to the other end (having the discharge outlet 14) of the cylindrical body 11. A heating coil 18 of an induction heating apparatus or of a resistance heating apparatus is disposed around the outer periphery of the cylinder body 11 and located close to and separate from the outer peripheral surface of the cylinder body 11. This heating coil 18 and the above heating cylinder 12 constitute means for heating the cylinder body 11. A temperature sensor installation pipe 19 is disposed along the axis of the cylinder body 11 so that temperature sensors (not shown) are installed therein.

The second heat treating furnace 20 is located generally parallel with the first heat treating furnace 10 and arranged similarly to the first heat treating furnace 20. Specifically, the second heat treating furnace 20 includes a rotatable cylinder body 21. A heating cylinder 22 is sealingly disposed surrounding the cylinder body 21 under the action of a dynamic seal P, and located coaxial with the cylinder body 21 so as to form a gas duct into which high temperature gas is introduced in order to heat the cylindrical body 21. The cylinder body 21 is formed at its one end with a supply inlet 23 through which the treatable material is supplied into the cylinder body 21, and at the other end with a discharge outlet 24. The cylindrical member 21 is driven to rotate around its axis under the action of a rotationally driving device 25 which includes a driving motor 25a to which a driving gear 25b is drivably connected. A driven gear 25c is provided on the peripheral surface of the cylinder body 21 to be coaxial with the cylindrical body 21. The driven gear 25c is engaged with the driving gear 25b.

A supply duct 26 is provided to the one end of the cylinder body 11 in a manner to sealingly surround the one end (having the supply inlet 23) of the cylinder body 21 under the action of the dynamic seal P. A discharge duct 27 is provided to the other end (having the discharge outlet 24) of the cylinder body 11. A heating coil 28 of the induction heating apparatus or of the resistance heating apparatus is disposed around the outer periphery of the cylinder body 21 and located close to and separate from the outer peripheral surface of the cylinder body 21. This heating coil 28 and the above heating cylinder 22 constitute means for heating the cylinder body 21. A temperature sensor installation pipe 29 is disposed along the axis of the cylinder body 21 so that temperature sensors (not shown) are installed therein.

A hopper 30 is provided above the first heat treating furnace 10 and arranged such that a mixture of the treatable material and the treatment agent such as alkali metal compound is cast therethrough. The mixture is supplied through a valve 31 and the supply inlet 13 into the cylinder body 11. The treatable material may be solid, ash or sludge of waste such as general waste or industrial waste. This hopper 30 may have a pulverizing function and a mixing function for the mixture so that the solid is pulverized and mixed with the treatment agent. It will be understood that the treatable material may be previously pulverized and mixed with the treatment agent to form the mixture before the mixture is cast into the hopper 30.

The cylinder bodies 11, 20 of the first and second heat treating furnaces 10, 20 are disposed up and down, in which the discharge duct 17 of the cylinder body 11 is connected through a valve (open-and-close door) 32 to the supply inlet 23 of the cylinder body 21. The discharge duct 27 of the cylinder body 21 of the second heat treating furnace 20 is connected through a valve (open-and-close valve) 33 to a dissolving vessel 34, so that residue formed in the heat treating of the treatable material and the treatment agent subjected to reaction is discharged to the dissolving vessel 34.

A LNG burning device 35 is provided to generate high temperature or heated gas, for example, by burning LNG supplied from a LNG tank 36. This high temperature gas is supplied into the heating cylinder 22 disposed around the cylinder body 21 to heat the cylinder body 21, and then is fed through a communication pipe 37 into the heating cylinder 12 to heat the cylinder body 11. Thereafter, the high temperature gas is fed through a discharge pipe 38 to a drying device 39 in which drying action is made under heat of the gas. Finally, the gas is fed through a pipe 41 to a burning device 42. This burning device 42 is arranged to burn gas from the discharge duct 17 of the first heat treating furnace 10, gas from the supply duct 26 of the second heat treating furnace 20 and gas which is fed from the burning device 35 and has been used to heat various sections required to be heated. Accordingly, the burning device 42 generates burnt gas which is fed to a bag filter 40. The burning device 42 is arranged to burn gas, remove tar content, and cool the burnt gas to a temperature lower than a level at which durability of the bag filter is affected.

In the bag filter 40, the gas from the burning device 42 is treated with the treatment agent, and thereafter a non-reacted part of the treatment agent is fed to the hopper 30 and reused. Waste gas from the bag filter 40 is fed to a waste gas burning section 43 in which the waste gas is burnt under the action of LNG or the like. The thus burnt waste gas is discharged from a chimney 44.

A dehydrating device 45 is provided to make a solid-liquid separation for the content of the dissolving vessel 34 so as to separate a solid content from a liquid content. The separated solid content is dried by a drying device 39, and thereafter is discharged to a carbonized substance hopper 46. The liquid content is neutralized with a neutralizer or the like in a water treating device 47, and then is fed back to the dissolving vessel 34 to be reused.

Figure 2A:
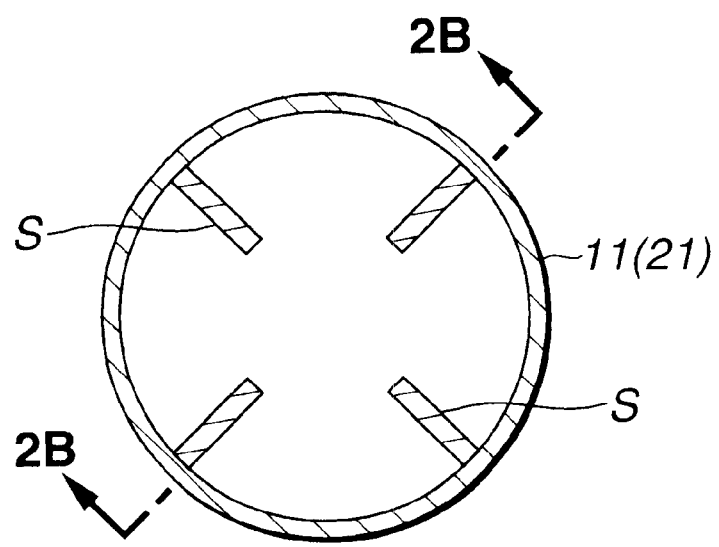
FIG. 2A is a cross-sectional view of a cylinder body of a first (second) heat treating furnace forming part of the waste treating system of FIG. 1.
Figure 2B:
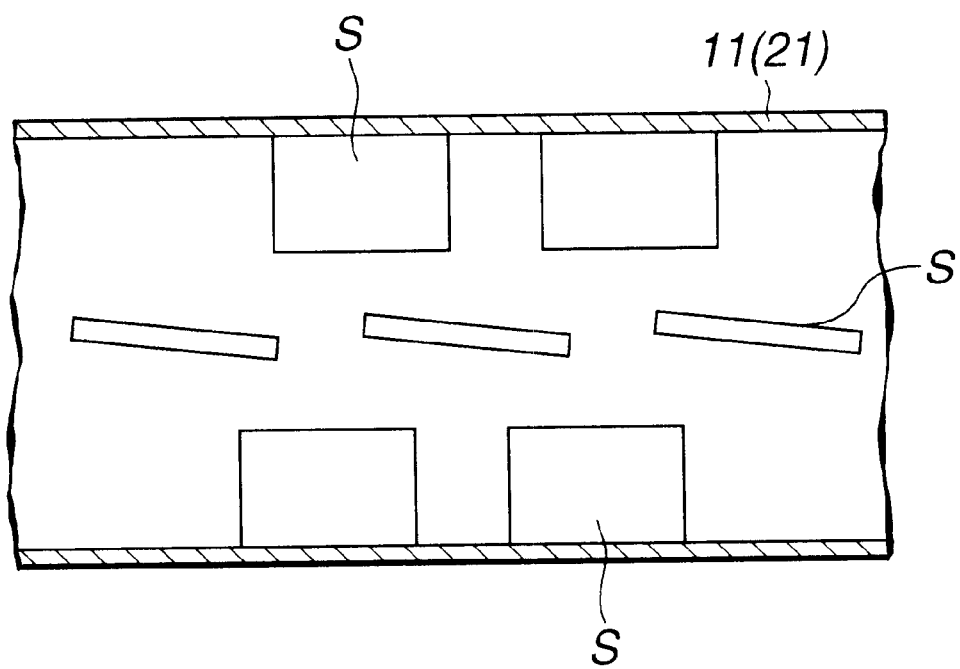
FIG. 2B is a cross-sectional view taken in the direction substantially along the line 2B—2B in FIG. 2A.

In this embodiment, each of the cylinder body 11 and the cylinder body 21 is arranged as shown in FIGS. 2A and 2B which are sectional views. As shown, the cylinder body 11 is provided at its inner surface with a plurality of blades S which serve to stir the treatable material itself and the mixture of the treatable material and the treatment agent which have been supplied to the cylinder body 11 and to cause the mixture to move from the side of the supply inlet to the side of the discharge outlet. The cylinder body 11, 21 may be disposed in such a manner that the side of the supply inlet is slightly higher than the side of the discharge outlet in order to smoothen such movement of the mixture.

Next, a waste treatment process using the treatment facility shown in FIG. 1 will be discussed.

First, LNG is burnt in the burning device 35 to generate high temperature gas which is supplied to the heating cylinders 22, 12. Additionally, alternating current is supplied to the heating coils 18, 28 to heat the cylinder bodies 21, 11, if necessary. Subsequently to or simultaneously with supply of the high temperature gas to the heating cylinders 22, 12, the mixture of the treatable material (containing substance, sulfur and the like) and the alkali material such as alkali metal compound is supplied through the hopper 30 into the cylinder body 11 of the first heat treating furnace 10. It will be understood that the treatable material and the alkali material may be supplied separately into the cylinder body 11 and mixed within the cylinder body 11.

Thus, the mixture is subjected to a heat treatment in the cylinder body 11 of the first heat treating furnace 10, at a certain heating temperature (for example, 200° C. to 350° C.) and for a certain heating time. Such heating temperature and time have been predetermined in accordance with the result of investigation to obtain the character of the treatable material. In this investigation, for example, the temperature and the time required to generate HCl gas and SOx gas from the treatable material have been previously obtained. The heating temperature and the heating time depend on the condition (size and kind of the heating means) of the heat treating furnace 10, the amount of the treatable material to be treated, and the like, so that it is preferable to make sufficient investigation on the character of the treatable material and the performance of the waste treatment facility and to store experimental data for the character and the performance upon conducting experiments.

It will be noted that the treatable material within the cylinder body 11 of the first heat treating furnace 10 is subjected to dry distillation (baking in a covered container) or thermal decomposition and therefore is not subjected to combustion or burning. As a result of the dry distillation, HCl gas and SOx gas generated from the treatable material can be effectively brought into contact with the treatment agent (alkali metal compound) and can effectively react with the treatment agent.

In the cylinder body 11 of the first heat treating furnace 10, decomposition gas containing HCl and SOx (noxious substances or gases) is generated; however, HCl and SOx immediately react with alkali metal compound such as sodium hydrogen carbonate to form harmless sodium chloride (NaCl) and sodium sulfite ($Na_2SO_3$), thus removing noxious HCl and SOx from the decomposition gas. As a result, HCl and SOx in the decomposition gas and residue can be simultaneously made harmless.

Subsequently, the treatable material which has been made harmless upon generation of the noxious substances is fed through the valve 32 and the supply inlet 23 into the cylinder body 21 of the second heat treating furnace 20. In the cylinder body 21, the treatable material is subjected to carbonization upon being heated at a temperature ranging from 350° C. to 700° C. (carbonization of papers begins at 350° C.), or subjected to ashing upon being heated at a temperature not lower than 800° C. so as to reduce the volume of the treatable material. It is to be noted that no decomposition gas containing HCl and SOx exists in the cylinder body 21 of the second heat treating furnace 20 which accomplishes the volume reduction of the treatable material, and therefore the carbonized and ashed treatable material cannot absorb HCl and SOx.

The thus volume-reduced treatable material, the formed sodium chloride and sulfide, and the like are discharged through the valve 33 to the dissolving vessel 34. The volume-reduced treatable material, the treatment agent left after reaction and the like are mixed with water in the dissolving vessel 34 so that water-soluble components are dissolved in water. The content of the dissolving vessel 34 is subjected to dehydration by the dehydrating device 45, so that a solid content is separated from an aqueous solution containing the water-soluble components. The solid content is dried by the drying device 47 and then taken out from the carbonized substance hopper 46. The aqueous solution is fed to the water treating device 47 in which the treatment agent dissolved in the aqueous solution is recovered, and thereafter is subjected to a neutralization in which neutralizer or the like is poured into the aqueous solution. The thus neutralized aqueous solution is returned to the dissolving vessel 34 to be reused.

Temperature control for the first and second heat treating furnaces 10, 20 will be discussed.

The temperature control for the first heat treating furnace 10 is carried out by at least one of the following measures: (a) A valve (an open-and-close valve or a three-way valve) is disposed in each of the communication pipes 37 provided between the heating cylinder 22 of the second heat treating furnace 20 and the heating cylinder 12 of the first heat treating furnace 10, in which the valve is controllably opened and closed. (b) A plurality of the communication pipes 37 (only two shown) are provided between the heating cylinder 22 of the second heating treating furnace 20 and the heating cylinder 12 of the first heat treating furnace 10, in which the number of the operated communication pipes 37 is selected by controllably opening the valves 37. (c) Alternating current to be supplied to the heating coil 18 is controlled; or otherwise frequency of current to be applied is controlled in case of the induction heating apparatus. Such temperature control is made automatically or manually in accordance with gas concentration of HCl and/or the like (in the first heat treating furnace 10) detected by a gas concentration detector G1, and/or in accordance with temperature (in the first heat treating furnace 10) detected by the temperature sensor disposed in the temperature sensor installation pipe 19.

The temperature control for the second heat treating furnace 10 is carried out mainly by controlling the LNG burning device 35 in accordance with gas concentration of HCl (in the supply and discharge ducts 26, 27) detected by gas concentration detectors G2, G3 and/or in accordance with temperature (in the second heat treating furnace 20) detected by the temperature sensor disposed in the temperature sensor installation pipe 29. In addition, the temperature control for the second heat treating furnace 20 is carried out similarly to that for the first heat treating furnace 10 by at least one of the following measures: (a') The valve is disposed in each of the communication pipes 37 between the heating cylinder 22 of the second heat treating furnace 20 and the heating cylinder 12 of the first heat treating furnace 10 is controllably opened and closed. (b') The number of the operated communication pipes 37 (only two shown) between the heating cylinder 22 of the second heating treating furnace 20 and the heating cylinder 12 of the first heat treating furnace 10 is selected. (c') Alternating current to be supplied to the heating coil 28 is controlled; or otherwise frequency of current to be applied is controlled in case that the heating coil 28 is of the induction heating apparatus. Such temperature control is made automatically or manually in accordance with gas concentration of HCl and/or the like (in the second heat treating furnace 20) detected by the gas concentration detectors G2, G3, or in accordance with temperature (in the second heat treating furnace 20) detected by the temperature sensor disposed in the temperature sensor installation pipe 29.

While the cylinder bodies 11, 21 of the first and second heat treating furnaces 10, 20 have been shown and described as being rotatable and being provided thereinside with the blades S so that the treatable material within each cylinder body 11 is stirred and carried from the side of the supply inlet to the side of the discharge outlet, it will be understood that each cylinder body 11, 21 may not be rotatable so as to be fixed, in which a long screw member is disposed along the axis of the cylinder body and arranged to be driven from the outside.

Although the heating means for each cylinder body 11, 21 has been shown and described as including both the heating coil 18, 28 and the heating cylinder 12, 22, it will be understood that one of the heating coil and the heating cylinder may be used.

As appreciated from the above, it will be appreciated that chlorine-containing gas and sulfur oxides gas generated under decomposition of the treatable material effectively react with the alkali material such as alkali metal compound when the mixture of the treatable material and alkali metal compound is subjected to heat treatment in the heat treating furnace, thereby achieving simultaneously making both decomposition gas and residue harmless. This was confirmed by experiments as set forth below.

Hereinafter, the experiments for carrying out the treating process (more specifically, the decomposition and reaction step) according to the present invention will be discussed, in which comparison in experimental result is made between Examples and Comparative Examples.

The treating process of this experiment was carried out by using, as the treatable material, polyvinyl chloride and polyvinylidene chloride which contained a large amount of chloride components. As shown in Table 1, 20 g of a chlorine removal agent (sodium hydrogen carbonate) was added to 4 g of the treatable material (polyvinylidene chloride) to form a mixture to be heated, in Example 1-1. The chlorine removal agent (sodium hydrogen carbonate) in an amount of 20 g was added to 4 g of the treatable material (polyvinyl chloride) to form a mixture to be heated, in Example 1-2. The chlorine removal agent (potassium hydrogen carbonate) in an amount of 20 g was added to 4 g of the treatable material (polyvinylidene chloride) to form a mixture to be heated, in Example 1-3. The chlorine removal agent (sodium hydroxide) in an amount of 20 g was added to 4 g of the treatable material (polyvinylidene chloride) to form a mixture to be heated, in Example 1-4. The chlorine removal agent (potassium hydroxide) in an amount of 20 g is added to 4 g of the treatable material (polyvinylidene chloride) to form a mixture to be heated, in Example 1-5. No chlorine removal agent was added to 4 g of the treatable material (polyvinylidene chloride) in Comparative Example 1-1. A chlorine removal agent (slaked lime) which was not within the scope of the present invention was add in an amount of 20 g to 4 g of the treatable material (polyvinylidene chloride) to form a mixture to be heated, in Comparative Example 1-2. A chlorine removable agent (calcium carbonate) which was not within the scope of the present invention was added in an amount of 20 g to 4 g of the treatable material (polyvinylidene chloride) to form a mixture to be heated, in Comparative Example 1-3. The chlorine removal agent was in the form of powder having an average particle size of 100 $\mu$m, in all Example and Comparative Examples.

In the experiment for each Example or Comparative Example, 4 g of the treatable material was put into a tank or furnace provided with an openable and closable door or lid, and then 20 g of the chlorine removal agent was added to and mixed with the treatable material in the tank to form the above-mentioned mixture, except for Comparative Example 1-1. Then, the tank was tightly sealed so that the inside the tank was isolated from the outside air or atmospheric air in order that the mixture was subjected to dry distillation upon heating. As a result, the low oxygen concentration atmosphere was formed within the tank. The thus sealed tank was stepwise heated by an electric furnace or heating coil, in which heating was made at eight temperature steps of 250° C., 300° C., 350° C., 400° C., 450° C., 500°C., 550°C., 600° C., and 600 to 1000° C. In this heating process, the temperature at each of the eight steps was kept for 5 minutes, in which a concentration of hydrogen chloride gas in the tank was measured at each temperature rising time (at which the temperature was rising from one temperature step to the next temperature step) and at each temperature keeping time (at which the temperature at each temperature step was keeping). The temperature rising time is indicated as "Rising time" while the temperature keeping time is indicated as "Keeping time" in Table 1. The tank was provided with a gas discharge pipe through which gas and pressure generated in the tank upon heating was discharged out of the tank. The measurement of the hydrogen chloride gas concentration was accomplished by using a detector tube according to JIS (Japanese Industrial Standard) - K0804, in which the detector tube was inserted into the gas discharge pipe to measure the hydrogen chloride gas concentration. Results of the hydrogen chloride gas concentration measurement were shown in Table 1. It is to be noted that ten times of the above experiment were repeated to obtain ten actual measured values of the hydrogen gas concentration for each Example and Comparative Example, in which the measured value (shown in Table 1) for each Example indicates the highest value in the measured values while the measured value (shown in Table 1) for each Comparative Example indicates the lowest value in the measured values. Additionally, "ND" in Table 1 indicates the fact that no hydrogen chloride gas was detected in any of 10 times hydrogen chloride gas concentration measurements to obtain the ten actual measured values. Further, manners of post-treatment for the chlorine removal agent were inspected and shown as "Post-treatment for chlorine removal agent" in Table 1.

As appreciated from the above, it has been revealed that the alkali metal compound, serving as the chlorine removal agent, can convert noxious chlorine-containing gas into harmless chloride under a reaction in which the alkali metal reacts with chlorine to form chloride of alkali metal. A preliminary test (Comparative Example 1) was conducted in which polyvinylidene chloride containing a large amount of chlorine component was used as the treatable material. As a result of this test, it was confirmed that a large amount of hydrogen chloride was generated as shown in the column of Comparative Example 1-1 in Table 1.

Subsequently, comparative tests (Comparative Examples 1-2 and 1-3) were conducted in which slaked lime and calcium carbonate were respectively used as the conventional chlorine removal agents. As a result, generation of hydrogen chloride could be suppressed to some extent; however, it was confirmed that such a suppression effect due to the conventional chlorine removal agents was not sufficient and was required to be further improved.

As a result of the tests (Examples 1-1 to 1-5), it has been revealed that generation of hydrogen chloride could be generally completely suppressed at any temperature regions, and that sodium hydrogen carbonate was very excellent as the chlorine removal agent.

Thus, the above discussion demonstrates that if alkali metal compound (to be able to react with chloride) is added to the treatable material to form the mixture to be subjected to the heat treatment, chlorine-containing gas generated from the treatable material can effectively dechlorinated and become harmless.

Here, discussion will be made depending upon the above experimental results shown in Table 1.

First in case that polyvinylidene chloride was used as the treatable material containing a large amount of chlorine component and that no chlorine removal agent was used as shown in Comparative Example 1-1, a large amount of hydrogen chloride gas was generated throughout a wide temperature region in the heat treatment or heating process. Generation of hydrogen chloride gas could be suppressed to some extent as compared with Comparative Example 1-1, in Comparative Examples 1-2 and 1-3 where slaked lime and calcium carbonate were added as the chlorine removal agent to the treatable material, respectively. However, it was confirmed that such suppression for hydrogen chloride gas was insufficient.

In contrast, in Examples 1-4 and 1-5 where 20 g of sodium hydroxide and 20 g of potassium hydroxide were added as the chlorine removal agent respectively to the same treatable materials, an extremely slight amount (1 ppm and 2 ppm) of hydrogen chloride was found to be generated at the rising and keeping times of 450° C. in Examples 1-4 and 1-5. However, in other Examples, no hydrogen chloride gas generation was found throughout whole temperature regions of the heat treatment or in heating process, thereby exhibiting good experimental results as compared with those of Comparative Examples 1-1 to 1-3. In conclusion, it has been confirmed that addition of alkali metal compound (to be able to react with chloride) to the treatable material in the heat treatment or heating process can effectively accomplish dechlorination of chlorine-containing gas generated from the treatable material thereby causing the chlorine-containing gas to become harmless.

It is to be noted that experiments similar to the above were conducted heating the treatable material at a higher temperature condition over 600° C., which exhibited similar experimental results to the above. The temperature for heating the mixture of the treatable material and the chlorine removal agent is preferably within a range of not higher than 1000° C. from the view point of the fact that a facility for carrying out the treating process of the present invention is required to be large-sized if the temperature is raised over 1000° C.

In conclusion, it has been confirmed that addition of alkali substance such as alkali metal compound (to be able to react with chloride) to the treatable material containing chlorine in the heat treatment or heating process effectively accomplish dechlorination of chlorine-containing gas generated from the treatable material thereby causing the chlorine-containing gas to become harmless while forming harmless chloride.

In the above experiments, the residue was left in the tank after the heating process had been completed. The residue was subjected to inspection, upon which it was detected that the residue did not contain noxious chlorine-containing gas component and contained harmless chloride or sodium chloride. The residue was put into water and stirred for 10 minutes, in which sodium chloride was dissolved in water while carbonized materials remained. It was also detected that the carbonized materials did not contain chlorine-containing gas component.

Accordingly, chlorine-containing compound and chlorine component in the treatable material can be converted into sodium chloride (NaCl), water ($H_2O$) and carbon dioxide gas ($CO_2$), and therefore hydrogen chloride forming part of a source of dioxin cannot be formed thereby realizing the unexpected result of making both emitted gas and residue harmless.

In addition to the above-discussed experiments, further experiments were conducted by using a refused derived fuel (referred hereinafter to as "RDF") as the treatable material. The RDF was formed from a waster or refuse and contains the following components:

Garbage including refuse of meat, fish, bone, egg-shell, vegetable, fruit and the like;

Plastic waste including polyethylene, polypropylene, polystyrene, polyvinylidene chloride, and the like;

Papers including tissue paper, advertisement bill, paper bag, paper box, and paper packing for drink, and the like; and Combustibles including fiber matters such as fabric, wood piece, rubber, leather and the like.

As a result of analysis, it had been confirmed that RDF used in the experiments contained 60.173% by weight of carbon (C), 16.277% by weight of oxygen (O), 10.745% by weight of silicon (Si), 7.045% by weight of calcium (Ca), 3.314% by weight of aluminum (Al), 0.888% by weight of magnesium (Mg), 0.505% by weight of phosphorus (P), 0.466% by weight of chlorine (Cl), 0.331% by weight of sulfur (S), and 0.155% by weight of potassium (K), 0.101% by weight of sodium (Na).

The experiments in connection with the present invention (Examples) used RDF (not subjected to heat treatment or incineration) as the treatable material, whereas the experiments for the comparison purpose (Comparative Examples) used treated RDF (subjected to the thermal or incineration). For reference, in general, RDF whose main component is plastic contains 0.29 to 0.89% by weight of chlorine component, and RDF whose main component is paper contains 0.2% by weight of chlorine component. Additionally, it is general that the treated RDF contains about 1.0% by weight of sulfur component.

As shown in Table 2, concerning Examples, 10 g of the chlorine removal agent (sodium hydrogen carbonate) was added to 40 g of the treatable material (crushed RDF) to form a mixture to be heated, in Example 2-1. The chlorine removal agent (sodium hydrogen carbonate) in an amount of 4 g was added to 40 g of the treatable material (crushed RDF) to form a mixture to be heated, in Example 2-2. The chlorine removal agent (potassium hydrogen carbonate) in an amount of 3 g was added to 40 g of the treatable material (crushed RDF) to form a mixture to be heated, in Example 2-3. The chlorine removal agent (sodium carbonate and potassium carbonate) in an amount of 3 g was added to 20 g of the treatable material (crushed RDF) to form a mixture to be heated, in Example 2-4. The chlorine removal agent (sodium hydroxide) in an amount of 3 g was added to 20 g of the treatable material (crushed RDF) to form a mixture to be heated, in Example 2-5. The chlorine removal agent (potassium hydroxide) in an amount of 3 g was added to 20 g of the treatable material (crushed RDF) to form a mixture to be heated, in Example 2-6. The chlorine removal agent (sodium hydrogen carbonate) in an amount of 10 g was added to 40 g of the treatable material (RDF which had not been crushed and in the form of mass) to form a mixture to be heated, in Example 2-7. The chlorine removal agent was in the form of powder having an average particle size of 100 µm, in all Examples.

As shown in Table 3, concerning Comparative Examples in which no noxious component removal agent was used, 40 g of the treated RDF which had been crushed was used as the treatable material in Comparative Example 2-1. The treated RDF which had been crushed was used in an amount of 20 g as the treatable material in Comparative Example 2-2. The treated RDF which had been not crushed and in the form of mass was used in an amount of 20 g as the treatable material in Comparative Example 2-3.

The experiment for each Example was conducted as follows: A predetermined amount of the treatable material was put into a tank or furnace, and then 20 g of the noxious component removal agent was added to and mixed with the treatable material in the tank to form the above-mentioned mixture. In the experiment for each Comparative Example, a predetermined amount of the treatable material was put into a tank or furnace. Then, the tank was tightly sealed so that the inside the tank was isolated from the outside air or atmospheric air in order that the mixture or only the treatable material was subjected to dry distillation upon heating. The thus sealed tank was stepwise heated with a heating coil, in which heating was made at eight temperature steps of 250° C., 300° C., 350° C., 400° C., 450° C., 500° C., 550° C., 600° C. In this heating step, the temperature at each of the eight steps was kept for 5 minutes, in which a concentration of HCl gas and a concentration of $SO_2$ in the tank was measured at each temperature rising time (at which the temperature was rising from one temperature step to the next temperature step) and at each temperature keeping time (at which the temperature at each temperature step was keeping). The temperature rising time is indicated as "Rising time" while the temperature keeping time is indicated as "Keeping time" in Tables 2 and 3. The tank was provided with a gas discharge pipe through which gas and pressure generated in the tank upon heating was discharged out of the tank. The measurement of the hydrogen chloride gas concentration was accomplished by using a detector tube according to JIS (Japanese Industrial Standard) - K0804, in which the detector tube was inserted into the gas discharge pipe to measure HCl and $SO_2$ gas concentrations. Results of HCl and $SO_2$ gas concentration measurement were shown in Tables 2 and 3. It is to be noted that ten times of the above experiment were repeated to obtain ten actual measured values of the hydrogen gas concentration for each Example and Comparative Example, in which the measured value (shown in Table 2) for each Example indicates the highest value in the measured values while the measured value (shown in Table 3) for each Comparative Example indicates the lowest value in the measured values. Additionally, "ND" in Tables 2 and 3 indicates the fact that no hydrogen chloride gas was detected in any of 10 times HCl and $SO_2$ g as concentration measurements to obtain the ten actual measured values. Further, results of post-treatment for the noxious component removal agent were inspected and shown as "Post-treatment for chlorine removal agent" in Tables 2 and 3.

The experimental results will be discussed hereinafter with reference to Tables 2 and 3.

Regarding hydrogen chloride gas (HCl):
(a) In case that the treatable material was crushed, a slight amount of HCl gas was detected in Example 2-4; however, no HCl gas was detected in other Examples so that the noxious component removal agents were highly effective for suppressing generation of HCl gas. This HCl gas generation suppression effect was considerably high as compared with Comparative Examples 2-1 and 2-2.
(b) In case that the treatable material was not crushed and used in the form of mass, a slight amount of HCl gas was detected at the temperature steps of 350 to 450° C. in Example 2-7 as compared with the case that the treatable material was crushed; however, it was confirmed that the results in Example 2-7 was considerably good as compared with those in Comparative Examples.

Regarding sulfur oxide gas ($SO_2$):
(a) In case that the treatable material was crushed, a slight amount of $SO_2$ g as was detected at the temperature steps of 400 to 450° C. in Examples 2-1 to 2-6; however, the results of Examples were very good as a whole so that the noxious component removal agents were highly effective for suppressing generation of $SO_2$ gas. This $SO_2$ g as generation suppression effect was considerably high as compared with Comparative Examples 2-1 and 2-2.
(b) In case that the treatable material was not crushed and used in the form of mass, a slight amount of $SO_2$ gas was detected at the temperature steps of 350 to 450° C. in Example 2-7 as compared with the case that the treatable material was crushed; however, it was confirmed that the results in Example 2-7 was considerably good as compared with those in Comparative Example 2-3.

As a result of the above experimental results and investigations, it has been confirmed that HCl and SOx can be generally completely made harmless by using the noxious component removal agent containing the alkali metal compound which effectively reacts with HCl and SOx to form harmless chloride and sulfite. Thus, the above reveals that if the noxious component removal agent is added to the treatable material to form the mixture to be subjected to the heat treatment, chlorine-containing gas and sulfur-containing gas generated from the treatable material can effectively become harmless.

It is to be noted that experiments similar to the above were conducted heating the treatable material at a higher temperature condition over 600° C., which exhibited similar experimental results to the above. The temperature for heating the mixture of the treatable material and the chlorine removal agent may be selected according to form of facilities for accomplish the heat treatment, time of the heat treatment, amount of the treatable material and the like.

Subsequently, discussion will be made on mechanisms of reaction between the noxious component removal agent and noxious gas (chlorine-containing gas and sulfur-containing gas), realizing unexpected results in which both emitted gas and residue are made harmless.

(1) Regarding hydrogen chloride gas (HCl):
In case of using sodium hydrogen carbonate as the noxious component removal agent, $$NaHCO_3 + HCl \rightarrow NaCl + H_2O + CO_2$$

In case of using potassium hydrogen carbonate as the noxious component removal agent, $$KHCO_3 + HCl \rightarrow KCl + H_2O + CO_2$$

In case of using sodium hydroxide as the noxious component removal agent, $$NaOH + HCl \rightarrow NaCl + H_2O$$

In case of using potassium hydroxide as the noxious component removal agent, $$KOH + HCl \rightarrow KCl + H_2O$$

It was confirmed that sodium hydrogen carbonate ($NaHCO_3$), sodium carbonate ($Na_2CO_3$), sodium sesqui carbonate ($Na_2CO_3 \cdot NaHCO_3 \cdot 2H_2O$), natural soda (containing $Na_2CO_3 \cdot NaHCO_3 \cdot 2H_2O$), sodium hydroxide (NaOH), potassium hydroxide (KOH), potassium carbonate ($K_2CO_3$), and potassium hydrogen carbonate ($KHCO_3$) could react with noxious HCl thereby to convert HCl into harmless chloride (NaCl and KCl) according to reaction formulae discussed before. It will be understood that sodium potassium carbonate and sodium carbonate hydrate can also react with noxious HCl similarly to the above.

Particularly in case of using the alkali metal hydrogen carbonate as the noxious component removal agent, the following tendency is predominant: First, $CO_2$ is separated at a temperature below a level (not lower than 250° C.) at which hydrogen chloride (HCl) is generated upon decomposition of the treatable material, forming NaOH or KOH. It is supposed that this forms an atmosphere in which reaction between NaOH or KOH and HCl is made smoothly. Here, the following reactions are made:

In case of sodium hydrogen carbonate, $$NaHCO_3 \rightarrow NaOH + CO_2$$

$$NaOH + HCl \rightarrow NaCl + H_2O$$

In case of potassium hydrogen carbonate, $$KHCO_3 \rightarrow KOH + CO_2$$

$$KOH + HCl \rightarrow KCl + H_2O$$

Thus, NaOH or KOH smoothly reacts with HCl thereby to newly form harmless chloride (NaCl, KCl).

In case of using calcium carbonate ($CaCO_3$) or slaked lime ($Ca(OH)_2$) as the noxious component removal agent, harmless chloride (CaCl) was formed; however, it seemed that smooth reaction between the noxious component removal agent and HCl could not be made.

After the heat treatment, the residue was left in the tank after the heating process had been completed. The residue was subjected to inspection, upon which it was detected that the residue did not contain noxious chlorine-containing gas component and contained harmless chloride (sodium chloride or potassium chloride). The residue was put into water and stirred for 10 minutes, in which the chloride was dissolved in water while carbonized materials remained. It was also detected that the carbonized materials did not contain chlorine-containing gas component.

Accordingly, chlorine-containing compound and chlorine component in the treatable material can be converted into sodium chloride (NaCl), potassium chloride (KCl), water ($H_2O$) and carbon dioxide gas ($CO_2$), and therefore hydrogen chloride forming part of a source of dioxins cannot be formed thereby realizing the unexpected result of making both emitted gas and residue harmless.

(2) Regarding sulfur oxide gas (SOx):

It was confirmed that the noxious component removal agent reacts with noxious SOx thereby to convert SOx into harmless sulfite as follows:

In case that sodium hydrogen carbonate is used as the noxious component removal agent, $$NaHCO_3 \rightarrow NaOH + CO_2$$

$$2NaOH + SO_2 \rightarrow Na_2SO_3 + H_2O$$

In case that potassium hydrogen carbonate is used as the noxious component removal agent, $$KHCO_3 \rightarrow KOH + CO_2$$

$$2KOH + SO_2 \rightarrow K_2SO_3 + H_2O$$

In case that sodium hydroxide is used as the noxious component removal agent, $$2NaOH + SO_2 \rightarrow Na_2SO_3 + H_2O$$

In case that potassium hydroxide is used as the noxious component removal agent, $$2KOH + SO_2 \rightarrow K_2SO_3 + H_2O$$

In case that sodium potassium carbonate is used as the noxious component removal agent, $$Na_2HCO_3 + K_2CO_3 + 2SO_2 \rightarrow Na_2SO_3 + K_2SO_3 + 2CO_2$$

Particularly in case of using the alkali metal hydrogen carbonate as the noxious component removal agent, the following tendency is predominant: First, $CO_2$ is separated at a temperature below a level (not lower than 300° C.) at which sulfur oxide ($SO_2$) is generated upon decomposition of the treatable material, forming NaOH or KOH. It is supposed that this forms an atmosphere in which reaction between NaOH or KOH and $SO_2$ is made smoothly. Here, the following reactions are made:

In case of sodium hydrogen carbonate, $$NaHCO_3 \rightarrow NaOH + CO_2$$

$$2NaOH + SO_2 \rightarrow Na_2SO_3 + H_2O$$

In case of potassium hydrogen carbonate, $$KHCO_3 \rightarrow KOH + CO_2$$

$$2KOH + SO_2 \rightarrow K_2SO_3 + H_2O$$

Thus, NaOH or KOH smoothly reacts with $SO_2$ thereby to newly form harmless sulfite ($Na_2SO_3$, $K_2SO_3$).

It was confirmed sodium carbonate ($Na_2CO_3$), sodium sesqui carbonate ($Na_2CO_3 \cdot NaHCO_3 \cdot 2H_2O$), natural soda (containing $Na_2CO_3 \cdot NaHCO_3 \cdot 2H_2O$), potassium carbonate ($K_2CO_3$), and sodium carbonate hydrate can react with noxious $SO_2$ thereby to convert $SO_2$ into harmless chloride sulfite ($Na_2SO_3$, $K_2SO_3$) according to reaction formulae discussed hereinbefore.

Upon the above-mentioned inspection of the residue, it was detected that the residue did not contain noxious sulfur-containing gas (SOx gas) component and contained harmless sulfite ($Na_2SO_3$, $K_2SO_3$). The residue was put into water and stirred for 10 minutes, in which the alkali metal sulfite was dissolved in water so as to assume alkaline under the following reactions:

$$Na_2SO_3 + 2H_2O \rightarrow 2NaOH + H_2SO_3$$

$$K_2SO_3 + 2H_2O \rightarrow 2KOH + H_2SO_3$$

Carbonized materials remained in water, in which it was also detected that the carbonized materials did not contain sulfur-containing (SOx) gas component.

Accordingly, sulfur-containing compound and sulfur component in the treatable material can be converted into sodium sulfite ($Na_2SO_3$) in powder form, and potassium sulfite ($K_2SO_3$) in powder form, water ($H_2O$) and carbon dioxide gas ($CO_2$), and therefore SOx gas can be prevented from generation thus realizing the unexpected result of making both emitted gas and residue harmless.

It will be appreciated that it is preferable that the treatment agent contains at least one of alkali metal carbonate, alkali metal hydrogen carbonate, and alkali metal hydroxide, i.e., at least one of sodium hydrogen carbonate ($NaHCO_3$), sodium carbonate ($Na_2CO_3$), sodium sesqui carbonate ($Na_2CO_3 \cdot NaHCO_3 \cdot 2H_2O$), natural soda (containing $Na_2CO_3 \cdot NaHCO_3 \cdot 2H_2O$), sodium hydroxide (NaOH), potassium hydroxide (KOH), potassium carbonate ($K_2CO_3$), and potassium hydrogen carbonate ($KHCO_3$), potassium sodium carbonate ($KNaCO_3 \cdot 6H_2O$). As will be understood, in the first heat treating furnace 10 in which the reactions according to the above chemical reactions are made, noxious hydrogen chloride gas and/or sulfur oxide gas are converted into harmless chloride (NaCl, KCl) and/or sulfite ($Na_2SO_3$, $K_2SO_3$), thereby making it possible to remove noxious components (hydrogen chloride and/or sulfur oxide) from the decomposition gas generated from the treatable material upon heating. Thus, the decomposition gas or emitted gas from the furnace can be effectively made harmless, while the residue can be also made harmless.

This residue which has been made harmless is transferred to and heated in the second heat treating furnace 20, in which the residue is reduced in volume, for example, under carbonization. Such carbonized residue containing harmless chloride and sulfite is taken out into the dissolving vessel 34. The chloride and sulfite can be effectively removed under a rinsing or dissolving treatment with water or the like. After the rinsing treatment, solid residual materials or carbonized materials remain in the tank to be reusable. Accordingly, the residual materials can be separated into respective materials which are different in characteristics by any separating means. The separated respective materials are dried and massed to be usable as fuel or the like. Additionally, liquid (such as water) used for the above rinsing treatment hardly contains no noxious substances and therefore can be discharged as it is to a river and the sea.

As discussed above, according to the present invention, at least two (first and second) heat treating furnaces are provided. In one (the first heat treating furnace) 10 of the heat treating furnaces, the treatable material is thermally decomposed to generate the substance containing the noxious component, and simultaneously the substance contacts and reacts with the treatment agent, thus making the treatable material harmless. In the other (second) heat treating furnace 20, the treatable material is reduced in volume after the treatable material is transferred from the first heat treating furnace 10. Accordingly, it will be understood that the number and the arrangement of the heat treating furnaces may be suitably selected in accordance with a variety of conditions such as conditions of a place at which the treating system is disposed. The number and the arrangement of the heat treating furnaces will be discussed with reference to FIGS. 3 to 6.

Figure 3:
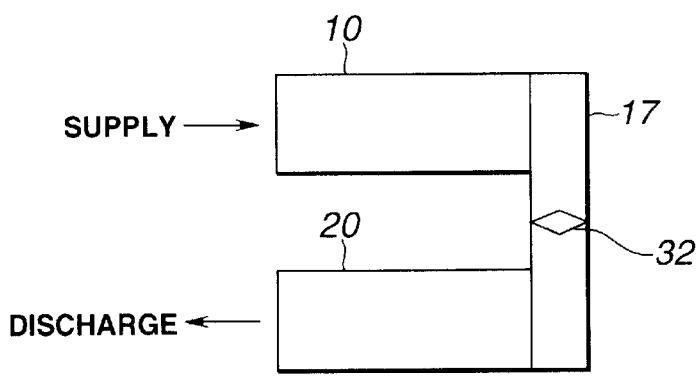
FIG. 3 is a schematic front illustration of a first mode of arrangement of the first and second heat treating furnaces forming part of the waste treating system.

FIG. 3 schematically shows a first mode of the arrangement of the first and second heat treating furnaces 10, 20 and the duct 17, in which the first and second heat treating furnaces 10, 20 are located respectively up and down in such a manner that their axes are generally parallel and reside in a generally vertical plane. The treatable material which has been treated in the first heat treating furnace 10 is transferred through the duct 3 to the second heat treating furnace 20 so as to be volume-reduced. The volume-reduced treatable material is discharged out of the second heat treating furnace 20. The valve or door 32 is disposed in the duct 3 to control transfer of the treatable material from the first heat treating furnace 10 to the second heat treating furnace 20.

Figure 4:
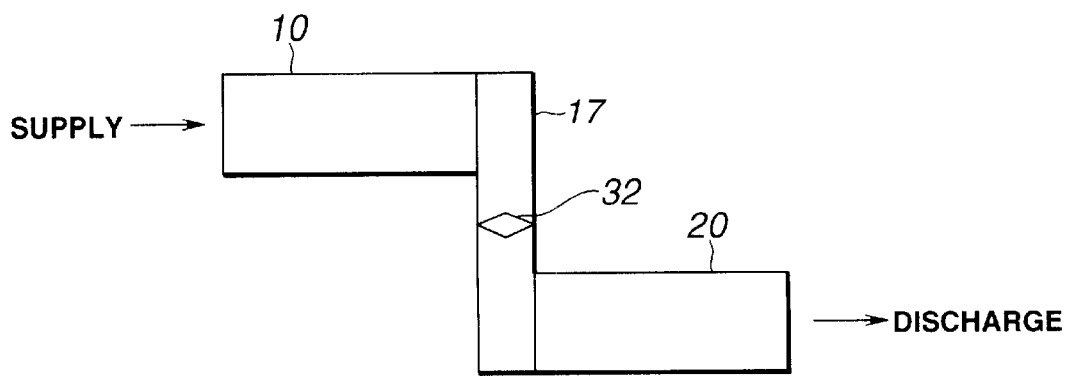
FIG. 4 is a schematic front illustration of a second mode of the arrangement of the first and second heat treating furnaces forming part of the waste treating system.

FIG. 4 schematically shows a second mode of the arrangement of the first and second heat treating furnaces 10, 20 and the duct 17, in which the first and second heat treating furnaces 10, 20 are located on the opposite sides of the duct 17 in such a manner that the axes of the first and second heat treating furnaces 10, 20 are generally parallel and not aligned with each other. It will be understood that the first and second heat treating furnaces 10, 20 may be located such that their axes are not parallel and not perpendicular to the duct 3, so that their axes may extend radially from the duct 3.

Figure 5A:
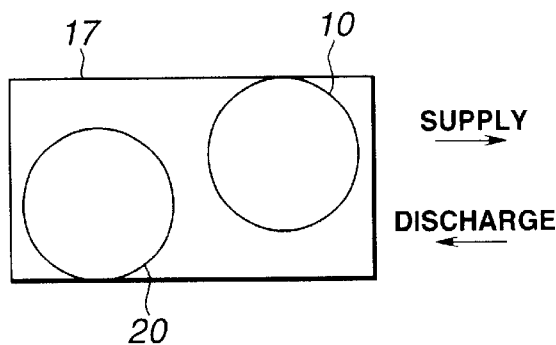
FIG. 5A is a schematic side illustration of a third mode of the arrangement of the first and second heat treating furnaces forming part of the waste treating system.
Figure 5B:
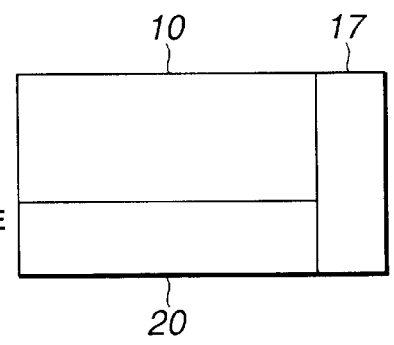
FIG. 5B is a schematic front illustration of the third mode of the arrangement of FIG. 5A.

FIGS. 5A and 5B schematically show a third mode of the arrangement of the first and second heat treating furnaces 10, 20 and the duct 17, similar to the arrangement of FIG. 3 with the exception that the axes of the first and second heat treating furnaces 10, 20 do not reside in the vertical plane and separate from each other in plan.

While the duct 3 has been shown as extending generally vertical in the first to third modes in FIGS. 3 to 5A and 5B, it will be understood that the duct 3 may not extend generally vertical and therefore may be inclined relative to the vertical plane.

Figure 6:
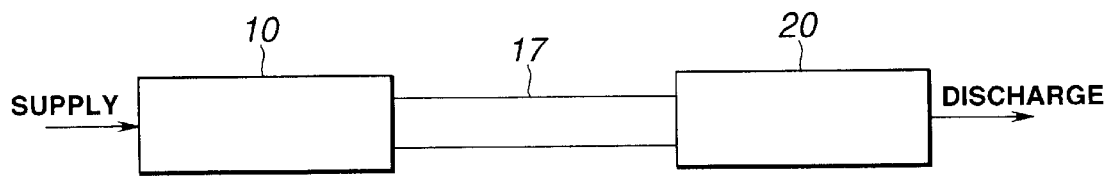
FIG. 6 is a schematic front illustration of a fourth mode of the arrangement of the first and second heat treating furnaces forming part of the waste treating system.

FIG. 6 schematically shows a fourth mode of the arrangement of the first and second heat treating furnaces 10, 20 and the duct 17, in which the first and second heat treating furnaces 10, 20 are located such that their axes reside generally on a horizontal plane. In this mode, a screw conveyor or another conveyor is disposed in the duct 17 so as to transfer the treatable material from the first heat treating furnace 10 to the second heat treating furnace 20.

As discussed above, according to the present invention, the decomposition and reaction step and the volume-reduction step are carried out in the separate heat treating furnaces, respectively. In the decomposition and reaction step, the treatable material is thermally decomposed to generate the substance containing the noxious component, and simultaneously the substance contacts and reacts with the treatment agent. In the volume reduction step, the treatable material is reduced in volume after the decomposition and reaction step. Therefore, the present invention can provide the following advantageous effects:

(1) As apparent from the results of the experiments, when the treatable material (such as waste) containing chlorine and/or sulfur is subjected to heat treatment, noxious gas containing chlorine and/or sulfur are generated upon decomposition of the treatable material. However, according to the present invention, the thus generated noxious gas reacts with the alkali material (such as alkali metal compound) thereby to form harmless salt (s). As a result, it can be realized that both the noxious gas and the residue are made harmless. Additionally, the salt(s) in the residue can be removed by being rinsed with water or an aqueous solution, so that no noxious component can be dissolved in the water or the aqueous solution thereby safely treating the waste. Thus, chloride gas causing dioxins and sulfur oxides gas promoting air pollution can be effectively removed.

(2) In the decomposition and reaction step at which the decomposition gas containing noxious components are generated from the treatable material upon decomposition of the treatable material, both the treatable material and the treatment agent are heated so that contact and reaction between the decomposition gas and the treatment agent are smoothly and securely accomplished thereby to form harmless salt(s) while discharged or waste gas cannot contain the noxious components. Additionally, no corrosion occurs in a gas duct through which smoke passes. Further, the discharged gas can be safely used as fuel, or otherwise as heat source when it is at a high temperature or it is heated in case of being at a low temperature. The discharged gas is harmless and reusable as fuel for a turbine, a boiler and the like.

(3) The volume-reduction step at which the treatable material from which the decomposition gas has been removed is heated to be volume-reduced in the second heat treating furnace separate from the first heat treating furnace for the above decomposition and reaction step. Therefore, in the volume-reduction step, dioxins due to the noxious component(s) cannot exist in the residue, so that no dioxins are mixed in carbonized material or ash as the residue. This realizes making the residue harmless, in which metals and carbonized materials are taken out from the residue and reusable.

TABLE 1

| Item | | Example 1-1 | Example 1-2 | Example 1-3 | Example 1-4 | Example 1-5 | Comparative Example 1-1 | Comparative Example 1-2 | Comparative Example 1-3 |
|---|---|---|---|---|---|---|---|---|---|
| Item | Treatable material | Polyvinylidene chloride (4 g) | Polyvinyl chloride (4 g) | Polyvinylidene chloride (4 g) | Polyvinylidene chloride (4 g) | Polyvinylidene chloride (4 g) | Polyvinylidene chloride (4 g) | Polyvinylidene chloride (4 g) | Polyvinylidene chloride (4 g) |
| | Chlorine removal agent | Sodium hydrogen carbonate (20 g) | Sodium hydrogen carbonate (20 g) | Potassium hydrogen carbonate (20 g) | Sodium hydroxide (20 g) | Potassium hydroxide (20 g) | — | Slaked lime (20 g) | Calcium carbonate (20 g) |
| | | HCl concentration (not higher than) | HCl concentration (not higher than) | HCl concentration (not higher than) | HCl concentration (not higher than) | HCl concentration (not higher than) | HCl concentration (not higher than) | HCl concentration (not higher than) | HCl concentration (not higher than) |
| Temp. °C. | Measuring time | | | | | | | | |
| 250 | Rising time | ND | ND | ND | ND | ND | ND | ND | ND |
| | Keeping time | ND | ND | ND | ND | ND | ND | ND | ND |
| 300 | Rising time | ND | ND | ND | ND | ND | 450 ppm | 1 ppm | 15 ppm |
| | Keeping time | ND | ND | ND | ND | ND | 1000 ppm | 4 ppm | 35 ppm |
| 350 | Rising time | ND | ND | ND | ND | ND | 1000 ppm | 280 ppm | 350 ppm |
| | Keeping time | ND | ND | ND | ND | ND | 1000 ppm | 15 ppm | 50 ppm |
| 400 | Rising time | ND | ND | ND | ND | ND | 1000 ppm | 8 ppm | 20 ppm |
| | Keeping time | ND | ND | ND | ND | ND | 1000 ppm | ND | 15 ppm |
| 450 | Rising time | ND | ND | ND | 1 ppm | ND | 650 ppm | 5 ppm | 10 ppm |
| | Keeping time | ND | ND | ND | ND | 2 ppm | 400 ppm | ND | 7 ppm |
| 500 | Rising time | ND | ND | ND | ND | ND | 1000 ppm | ND | 3 ppm |
| | Keeping time | ND | ND | ND | ND | ND | 580 ppm | ND | ND |
| 550 | Rising time | ND | ND | ND | ND | ND | 1000 ppm | ND | ND |
| | Keeping time | ND | ND | ND | ND | ND | 500 ppm | ND | ND |
| 600 | Rising time | ND | ND | ND | ND | ND | 600 ppm | ND | ND |
| | Keeping time | ND | ND | ND | ND | ND | 50 ppm | ND | ND |
| 600 ~ 1000 | Rising time | ND | ND | ND | ND | ND | ND | ND | ND |
| | Keeping time | ND | ND | ND | ND | ND | ND | ND | ND |
| Post-treatment for chlorine removal agent | | Soluble in water | Soluble in water | Soluble in water | Soluble in water | Soluble in water | — | Slightly soluble in water | Slightly soluble in water |

TABLE 2

| | | Example 2-1 | | Example 2-2 | | Example 2-3 | | Example 2-4 | |
|---|---|---|---|---|---|---|---|---|---|
| | Treatable material | RDF Crushed 40 g | | RDF Crushed 40 g | | RDF Crushed 20 g | | RDF Crushed 20 g | |
| | Noxious comp. removable material | NaHCO$_3$ 10 g | | NaHCO$_3$ 4 g | | KHCO$_3$ 3g | | Na$_2$CO$_3$ K$_2$CO$_3$ 3g | |
| °C. | time | HCl concentration (not higher than) | SO$_2$ concentration (not higher than) | HCl concentration (not higher than) | SO$_2$ concentration (not higher than) | HCl concentration (not higher than) | SO$_2$ concentration (not higher than) | HCl concentration (not higher than) | SO$_2$ concentration (not higher than) |
| Temp. °C. | Measuring time | | | | | | | | |
| 250 | Rising time | ND | ND | ND | ND | ND | ND | ND | ND |
| | Keeping time | ND | ND | ND | ND | ND | ND | ND | ND |
| 300 | Rising time | ND | ND | ND | ND | ND | ND | ND | ND |
| | Keeping time | ND | ND | ND | ND | ND | ND | ND | ND |
| 350 | Rising time | ND | ND | ND | ND | ND | ND | ND | ND |
| | Keeping time | ND | ND | ND | ND | ND | ND | ND | ND |
| 400 | Rising time | ND | ND | ND | 3 ppm | ND | 5 ppm | 2 ppm | 5 ppm |
| | Keeping time | ND | ND | ND | ND | ND | 4 ppm | ND | 3 ppm |
| 450 | Rising time | ND | ND | ND | ND | ND | 1 ppm | ND | ND |
| | Keeping time | ND | ND | ND | ND | ND | ND | ND | ND |
| 500 | Rising time | ND | ND | ND | ND | ND | ND | ND | ND |
| | Keeping time | ND | ND | ND | ND | ND | ND | ND | ND |
| 550 | Rising time | ND | ND | ND | ND | ND | ND | ND | ND |
| | Keeping time | ND | ND | ND | ND | ND | ND | ND | ND |
| 600 | Rising time | ND | ND | ND | ND | ND | ND | ND | ND |
| | Keeping time | ND | ND | ND | ND | ND | ND | ND | ND |
| Post-treatment for noxious comp. removal agent | | Soluble in water | | Soluble in water | | Soluble in water | | Soluble in water | |

| | | Example 2-5 | | Example 2-6 | | Example 2-7 | |
|---|---|---|---|---|---|---|---|
| | Treatable material | RDF Crushed 20 g | | RDF Crushed 20 g | | RDF Mass 40 g | |
| | Noxious comp. removable material | NaOH 3g | | KOH 3g | | NaHCO$_3$ 10 g | |
| °C. | time | HCl concentration (not higher than) | SO$_2$ concentration (not higher than) | HCl concentration (not higher than) | SO$_2$ concentration (not higher than) | HCl concentration (not higher than) | SO$_2$ concentration (not higher than) |
| Temp. °C. | Measuring time | | | | | | |
| 250 | Rising time | ND | ND | ND | ND | ND | ND |
| | Keeping time | ND | ND | ND | ND | ND | ND |
| 300 | Rising time | ND | ND | ND | ND | ND | ND |
| | Keeping time | ND | ND | ND | ND | ND | ND |
| 350 | Rising time | ND | ND | ND | ND | ND | ND |
| | Keeping time | ND | ND | ND | ND | 2 ppm | 5 ppm |
| 400 | Rising time | ND | 1 ppm | ND | 1 ppm | 16 ppm | 15 ppm |
| | Keeping time | ND | ND | ND | ND | 8 ppm | 5 ppm |
| 450 | Rising time | ND | ND | ND | ND | 2 ppm | 2 ppm |
| | Keeping time | ND | ND | ND | ND | ND | ND |
| 500 | Rising time | ND | ND | ND | ND | ND | ND |
| | Keeping time | ND | ND | ND | ND | ND | ND |
| 550 | Rising time | ND | ND | ND | ND | ND | ND |
| | Keeping time | ND | ND | ND | ND | ND | ND |
| 600 | Rising time | ND | ND | ND | ND | ND | ND |
| | Keeping time | ND | ND | ND | ND | ND | ND |
| Post-treatment for noxious comp. removal agent | | Soluble in water | | Soluble in water | | Soluble in water | |

TABLE 3

| | | Comparative Example 2-1 | | Comparative Example 2-2 | | Comparative Example 2-3 | |
|---|---|---|---|---|---|---|---|
| | Treatable material | Treated RDF Crushed 40 g | | Treated RDF Crushed 20 g | | Treated RDF Mass 40 g | |
| | Noxious comp. removable agent | — | | — | | — | |
| | | HCl concentration (not higher than) | SO₂ concentration (not higher than) | HCl concentration (not higher than) | SO₂ concentration (not higher than) | HCl concentration (not higher than) | SO₂ concentration (not higher than) |
| Temp. °C. | Measuring time | | | | | | |
| 250 | Rising time | ND | ND | ND | ND | ND | ND |
| | Keeping time | ND | ND | ND | ND | ND | ND |
| 300 | Rising time | ND | ND | ND | ND | ND | ND |
| | Keeping time | ND | ND | ND | ND | ND | ND |
| 350 | Rising time | ND | 7 ppm | ND | 20 ppm | 2 ppm | 6 ppm |
| | Keeping time | 16 ppm | 40 ppm | 13 ppm | 17 ppm | 35 ppm | 60 ppm |
| 400 | Rising time | 70 ppm | 35 ppm | 30 ppm | 13 ppm | 1000 ppm | 60 ppm |
| | Keeping time | 60 ppm | 30 ppm | 3 ppm | 7 ppm | 130 ppm | 20 ppm |
| 450 | Rising time | 10 ppm | 7 ppm | 1 ppm | 4 ppm | 10 ppm | 10 ppm |
| | Keeping time | 2 ppm | 3 ppm | ND | ND | ND | 5 ppm |
| 500 | Rising time | ND | ND | ND | ND | ND | ND |
| | Keeping time | ND | ND | ND | ND | ND | ND |
| 550 | Rising time | ND | ND | ND | ND | ND | ND |
| | Keeping time | ND | ND | ND | ND | ND | ND |
| 600 | Rising time | ND | ND | ND | ND | ND | ND |
| | Keeping time | ND | ND | ND | ND | ND | ND |
| | Post-treatment for noxious comp. removal agent | — | | — | | — | |

What is claimed is:

1. A process for treating a treatable material containing chlorine as a noxious component, comprising the following steps:
   carrying out a first step for the treatable material, said first step including
   mixing a treatment agent with the treatable material to form a mixture, said treatment agent containing alkali material, said alkali material comprising at least one compound selected from the group consisting of an alkali metal compound and an alkaline-earth metal compound,
   supplying the mixture of the treatment agent and the treatable material into a rotatable cylindrical body of a first furnace,
   stirring the mixture and moving the mixture axially in the first furnace, and
   heating the mixture in a low oxygen concentration atmosphere in the rotatable cylindrical body of the first furnace at a first temperature at which the treatable material is decomposed to generate a substance containing the noxious component, by a heating device disposed outside the rotatable cylindrical body of the first furnace, said heating the mixture thermally decomposing the treatable material to generate the substance containing the noxious component, whereby the substance contacts and reacts with the treatment agent to form a chloride, to thereby form a treatable material residue containing the chloride, and
   carrying out a second (volume-reduction) step for the treatable material residue fed from the first furnace, said second step including
   heating the treatable material residue at a second temperature at which carbonization of the treatable material residue takes place, in a rotatable cylindrical body of a second furnace separate from said first furnace, said heating the treatable material residue accomplishing dry distillation of the treatable material residue so as to reduce volume of the treatable material residue, the second temperature being higher than the first temperature.

2. A process as claimed in claim 1, wherein said alkali metal compound is at least one compound selected from the group consisting of alkali metal carbonate, alkali metal hydrogen carbonate, and alkali metal hydroxide.

3. A process as claimed in claim 1, wherein said alkali metal compound contains at least one of sodium and potassium.

4. A process as claimed in claim 1, wherein said alkali metal compound is at least one compound selected from the group consisting of sodium hydrogen carbonate, sodium carbonate, sodium sesqui carbonate, natural soda, sodium hydroxide, potassium hydroxide, potassium carbonate, potassium hydrogen carbonate, and potassium sodium carbonate.

5. A process as claimed in claim 1, wherein said alkaline-earth metal compound is at least one compound selected from the group consisting of alkaline-earth metal oxide, alkaline-earth metal carbonate, and alkaline-earth metal hydroxide.

6. A process as claimed in claim 1, wherein said alkaline-earth metal compound is at least one compound selected from the group consisting of calcium hydroxide, calcium oxide, calcium carbonate, magnesium hydroxide, magnesium oxide, magnesium carbonate, barium hydroxide hydrate, barium oxide, barium carbonate, strontium hydroxide, strontium carbonate, and dolomite.

7. A process as claimed in claim 1, wherein the heating in the first step is carried out at a temperature ranging from 200 to 350° C.

8. A process as claimed in claim 1, wherein the temperature is within a range of from 350 to 700° C.

9. A process as claimed in claim 1, wherein the temperature is not lower than 800° C.

10. A process as claimed in claim 1, wherein the heating in the first step is carried out in the first furnace which is substantially sealed so as to prevent fresh air from being supplied into the first furnace, in which a pressure in said furnace leaking out of said furnace.

11. A process as claimed in claim 1, wherein the heating in the first step is carried out to make dry distillation of the treatable material.

12. A process as claimed in claim 1, wherein said mixing step comprises mixing an amount of said treatment agent that is at least sufficient to react with substantially all of the chlorine containing noxious component in the treatable material.

13. A process as claimed in claim 12, wherein the amount of said treatment agent is about 10% by weight of treatable material.

14. A process as claimed in claim 12, wherein the amount of said treatment agent is about 15% by weight of treatable material.

15. A process as claimed in claim 1, wherein said first heating step is carried out at a temperature and reaction time that are sufficient to react substantially all of the chlorine containing noxious component in the treatable material.

16. A process for treating a treatable material containing a noxious component, comprising the following steps:
   carrying out a first step for the treatable material, said first step including
      mixing a treatment agent with the treatable material to form a mixture, said treatment agent containing alkali metal compound, and
      heating the mixture in a first furnace at a first temperature in a low oxygen atmosphere to thermally decompose the treatable material to generate a substance containing the noxious component, the substance contacting and reacting with the treatment agent to form a harmless salt; and
   carrying out a second step for the treatable material, said second step including
      heating the treatable material in a second furnace separate from said first furnace, at a second temperature higher than the first temperature so as to reduce volume of the treatable material.

* * * * *